United States Patent
Misner (10) Patent No.: US 6,969,314 B2
(45) Date of Patent: Nov. 29, 2005

(54) AIR EXHAUSTER INVENTION

(75) Inventor: Howard R. Misner, Leonard, MI (US)

(73) Assignee: Cadillac Automotive Products Compang, Troy, MI (US)

( * ) Notice: Subject to any disclaimer, the term of this patent is extended or adjusted under 35 U.S.C. 154(b) by 103 days.

(21) Appl. No.: 10/137,148

(22) Filed: May 2, 2002

(65) Prior Publication Data
US 2002/0164943 A1 Nov. 7, 2002

Related U.S. Application Data (60) Provisional application No. 60/288,550, filed on May 3, 2001.

(51) Int. Cl.⁷ .................................................. B60H 1/26
(52) U.S. Cl. ..................... 454/162; 137/512.1; 137/855
(58) Field of Search ............................... 454/162, 164, 454/165; 137/67, 512.1, 855, 8.57

(56) References Cited

U.S. PATENT DOCUMENTS

| | | |
|---|---|---|
| 3,732,801 A | 5/1973 | Wallis |
| 4,432,514 A | 2/1984 | Brandon |
| 4,667,578 A * | 5/1987 | Hagenah ...................... 454/164 |
| 4,691,623 A | 9/1987 | Mizusawa |
| 4,781,106 A | 11/1988 | Frien |
| 5,085,132 A | 2/1992 | Ikeda et al. |
| 5,105,849 A | 4/1992 | Clough |
| 5,194,038 A * | 3/1993 | Klomhaus et al. .......... 454/162 |
| 5,263,895 A * | 11/1993 | Kraus et al. ................. 454/162 |
| 5,419,739 A | 5/1995 | Lewis |
| 5,503,178 A * | 4/1996 | Miskelley et al. ............ 137/67 |
| 5,601,117 A | 2/1997 | Lewis et al. |
| 5,904,618 A | 5/1999 | Lewis |
| 6,026,852 A | 2/2000 | Barton et al. |
| RE37,974 E * | 2/2003 | Bowers ....................... 137/855 |

* cited by examiner

Primary Examiner—Harold Joyce
(74) Attorney, Agent, or Firm—Harness, Dickey & Pierce, P.L.C.

(57) ABSTRACT

A pressure relief valve provided for installation in an opening in a motor vehicle body. In particular, the valve is configured to allow a volume of air to flow therethrough substantially equivalent to the volume of air permitted to flow through the opening if the valve was not installed therein. Furthermore, the valve is formed of flexible material for ease of installation into an opening that is smaller than the interior portion of pressure relief valve.

21 Claims, 6 Drawing Sheets

AIR EXHAUSTER INVENTION

CROSS-REFERENCE TO RELATED APPLICATIONS

This application claims the benefit of U.S. Provisional Application No. 60/288,550, filed May 3, 2001.

FIELD OF THE INVENTION

The present invention relates generally to a car cabin exhaust vent, and in particular to a pressure relief valve for vehicle ventilation of the cabin section.

BACKGROUND OF THE INVENTION

It is generally known in the art to provide a pressure relief valve for the cabin of many motor vehicles. In particular, larger vehicles include a plurality of pressure relief valves for allowing movement of air through the cabin or to relieve pressure during a sudden increase of pressure in the cabin. Furthermore, the valves work to allow a free flow of air for ventilation systems to allow for efficient cooling and heating of the cabin section.

Generally, the prior art valves include valve flaps that rest on a grille system or other such structure. The grille system, while leaving areas open for the flow of air, also obstructs the flow of air through the valve. Furthermore, prior art valves and vent systems generally comprise a rigid polymer structure that is closely sized to the aperture which must be produced within the vehicle body. Very small tolerances in the size of the aperture are permitted.

As such, prior art valves typically are no larger than the aperture in the body of the vehicle. Furthermore, prior art valve systems are unable to reach the optimal amount of air flow, that being the amount allowed by an empty or unrestricted aperture. In particular, prior art valve systems comprise structure that obstructs the optimum air flow through the aperture produced within the vehicle body. Therefore, while generally adequate in keeping rain, debris, and other materials from entering the vehicle body, such valve systems are less than ideally efficient in venting air outside the vehicle body.

SUMMARY OF THE INVENTION

The present invention of a pressure relief valve or air exhauster, comprises a body portion and a flap for closing the valve when no air is flowing therethrough. The entire air exhauster is formed as a fully flexible member. Unlike prior art, pressure relief valves, this flexibility allows portions of the air exhauster to be sized larger than the aperture of the vehicle body into which the air exhauster is to be mounted.

Furthermore, the air exhauster of the present invention is configured to permit air flow therethrough that is generally equivalent to the amount of air flow passing through an unobstructed aperture. This is accomplished in part by utilizing a generally funnel shape for the interior portion of the valve body. In addition, the air exhauster of the present invention does not require, but may include, a grille system to support the valve flaps.

One advantage of the air exhauster of the present invention is the ease of installation into an opening or aperture in a body of the vehicle created by the fully flexible nature of the exhauster. The flexible frame exhauster may be quickly and easily installed into the opening formed in the vehicle.

A further advantage of the present invention is the possibility of a unitarily formed exhauster. The valve flaps are unitarily formed with the valve body through hinge sections. This allows for a singular production piece not requiring further assembly after production of the component of parts. However, it is to be understood that the valve flaps may be manufactured separately and installed onto the valve body while remaining in the scope of the invention.

A still further advantage of the present invention is its self-sealing design. As part of its unitary design, the exhauster valve body includes a flange portion for sealing the exhauster valve with the vehicle body.

Still another advantage of the present invention is its funnel type configuration in which the inlet side has a greater cross-sectional dimension than the exhausting side. This helps ensure maximum air flow through the valve.

A further advantage of the present invention is that it comprises minimal structure or portions which obstruct the free flow of air being exhausted from the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
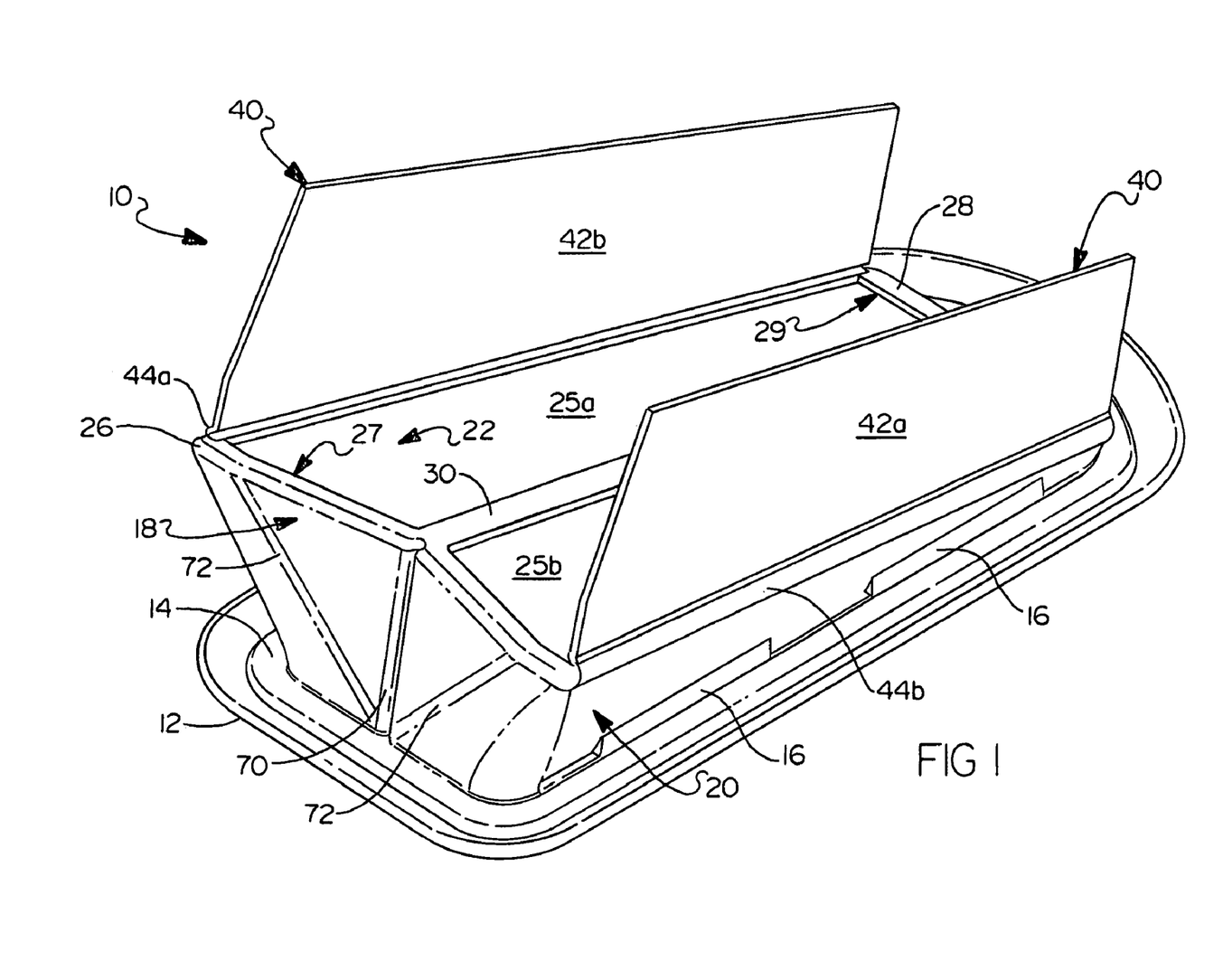
FIG. 1 is a perspective view of a pressure relief valve of the present invention taken from the inlet side after the exhauster is removed from the injection molding machine.
Figure 2:
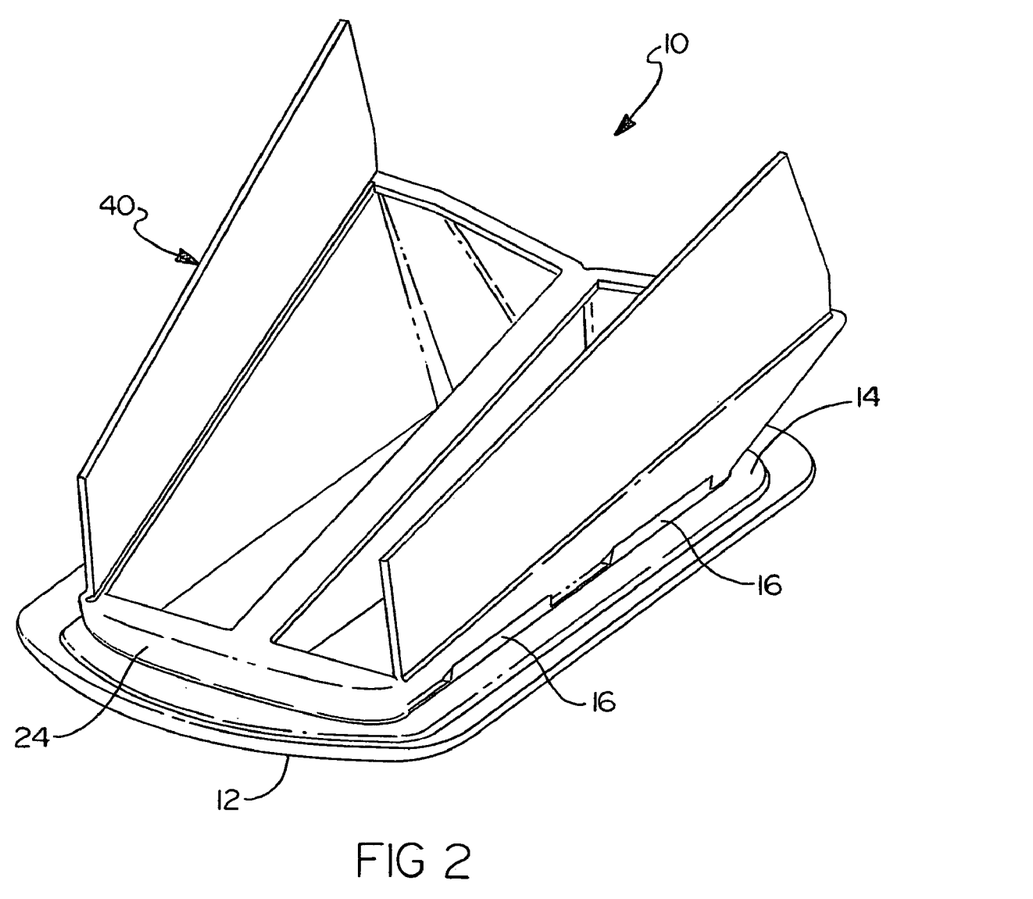
FIG. 2 is a perspective view of the pressure relief valve of FIG. 1 taken from the opposite end of the exhauster.

With reference to FIGS. 1 and 2, the general structure of the presently disclosed invention for a car cabin pressure exhauster is illustrated. The pressure relief exhauster or pressure relief valve is generally shown at 10. In particular, the pressure relief valve 10 includes a sealing flange 12 and a body flange 14 with a plurality of walls 18, 20, 22, and 24 affixed to and extending generally transversely from the body flange 14, vertical from and affixed to the body flange 14. Furthermore, the plurality of walls 18, 20, 22, 24 extend obliquely from the body flange 14 and define voids 25a, 25b through which air may flow.

Figure 5:
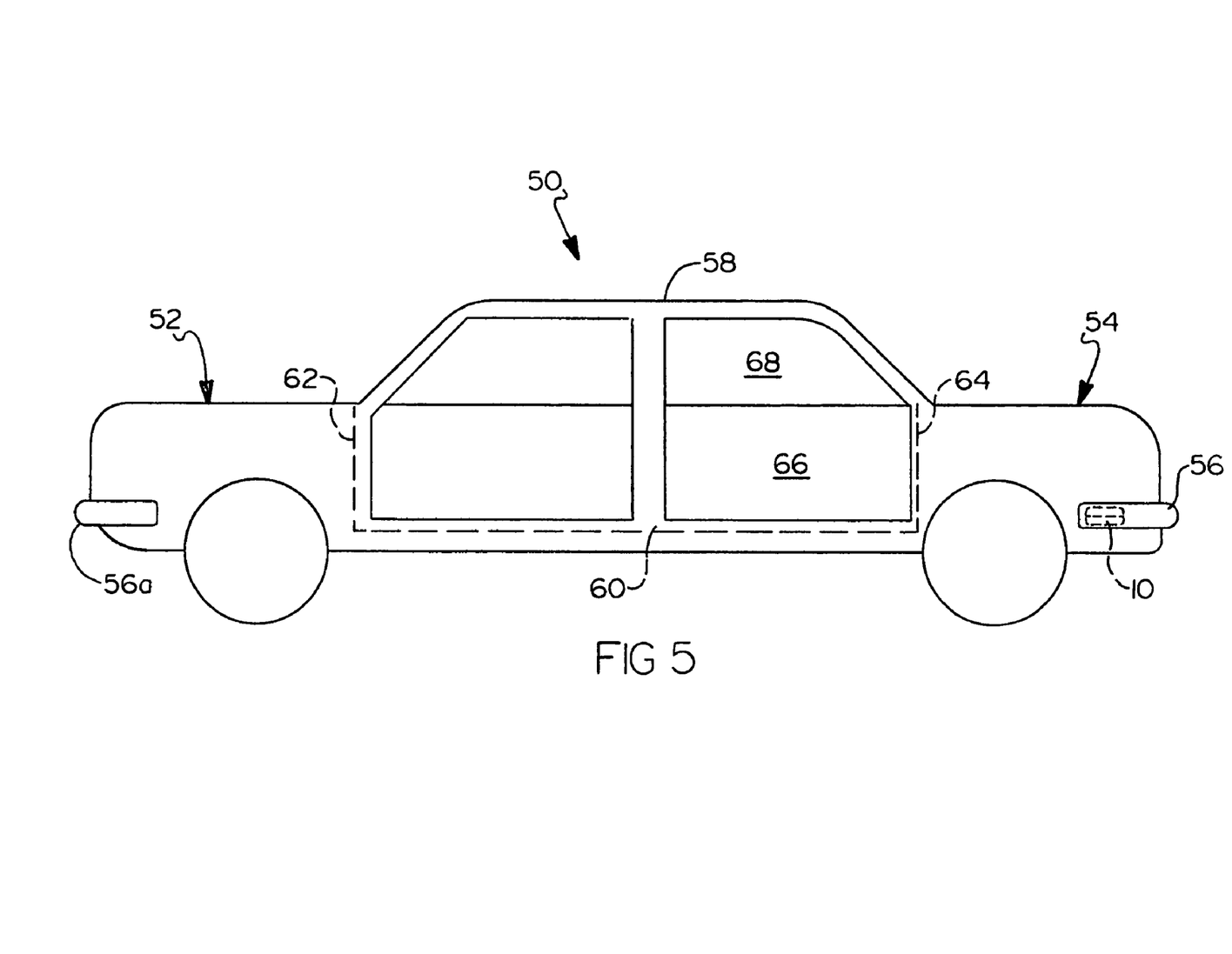
FIG. 5 is an environmental view of the pressure relief valve of FIG. 4, installed in an exemplary motor vehicle according to the present invention.

By way of illustration and not to be limiting, the presently illustrated pressure relief valve 10 includes a first end wall 18 and a second end wall 24 wherein the first end wall is of a greater height than the second end wall 24. This creates a slope to the top of the pressure relief valve 10 from the first end wall 18 towards the second end wall 24. Furthermore, the lateral walls 20, 22 also slope from the first end wall 18 end to the second end wall 24 end. At the junction of the lateral walls 22, 20 with the body flange 14 are engaging members 16. The engaging members 16 engage the sheet metal of a car vehicle's body (as shown in FIG. 5) into which the pressure relief valve 10 is installed. Therefore, the flange 12 not only seals pressure relief valve 10, but also prevents the pressure relief valve 10 from moving further into the vehicle while the engaging members 16 retain the valve against the vehicle body.

On the tops of the lateral walls 20, 22 are flaps 40 affixed thereto. The flaps 40 have a first side 42a and a second side 42b. The flaps 40 are affixed to the lateral walls 20, 22 with living hinge regions 44a, 44b. However, it is to be understood that the hinges 44a, 44b need not be integrally formed with the lateral walls 20, 22. In particular, a separate portion including the flaps 40 and hinges 44a, 44b may be affixed to the lateral walls 20, 22. The flaps 40 extend the general length of the lateral walls 20, 22 and the hinge regions 44a and 44b extend the full length of the flap 40 and top of the lateral wall.

The first end wall 18 terminates in a first upper region 26 which includes a lip 27 which overhangs the voids 25a, 25b whereas the second end wall 24 terminates in a second upper region 28 which includes a second lip 29 overhanging voids 25a, 25b. Furthermore, running medially between the first end wall 18 and the second end wall 24 is a third lip 30. With continuing reference to FIGS. 1 and 2 and further reference to FIG. 3, the lips 27 and 30 include an under lip or seating areas 27a and 30a. It is also to be understood that, although not shown, lip 29 also includes an under lip or seating area 29a. The respective under lip regions 27a, 29a and 30a provide a seat for the flaps 40.

Figure 3:
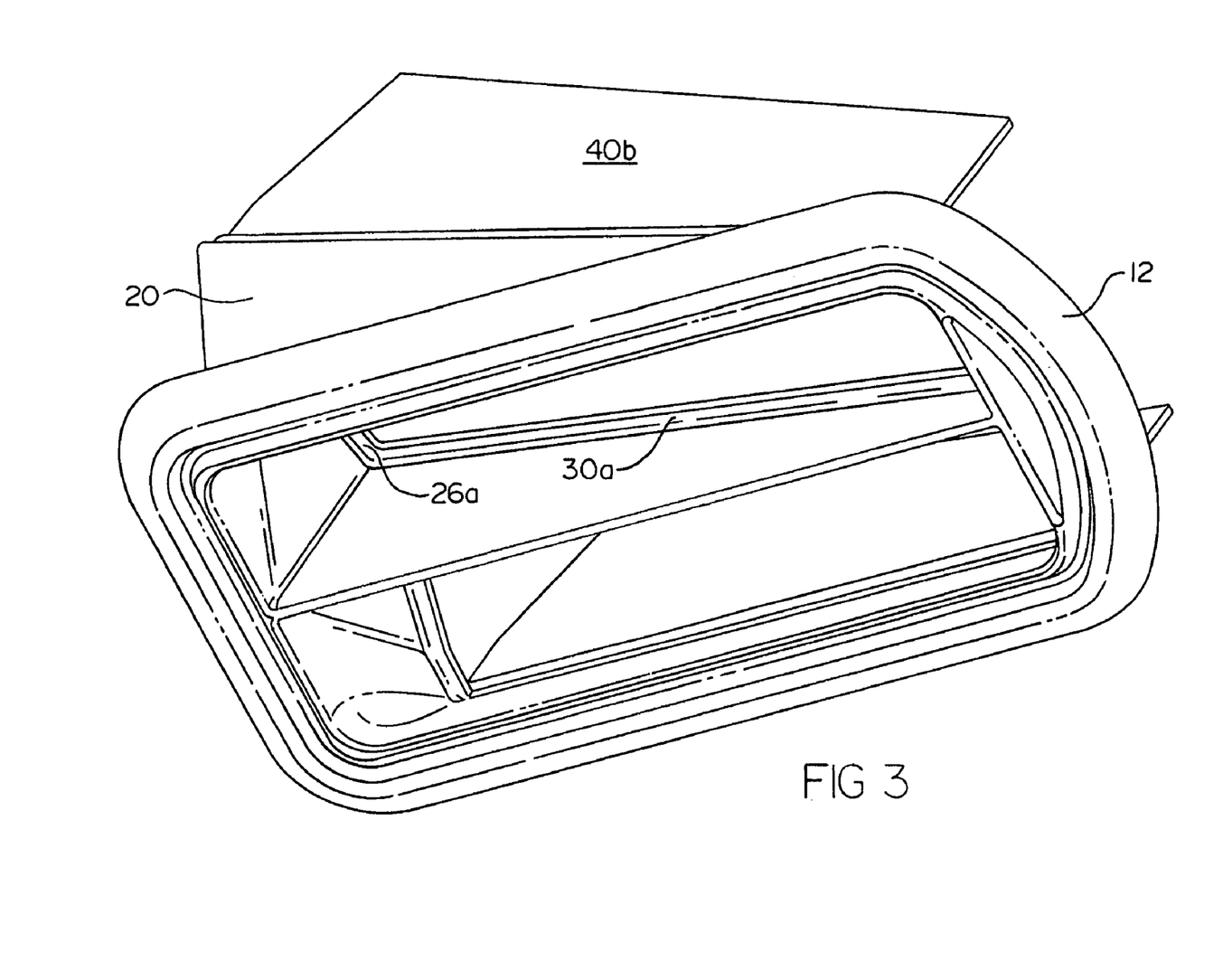
FIG. 3 is a perspective view of the pressure relief valve of FIG. 1, taken from the outlet side of the valve.

With reference FIGS. 1–3, the pressure relief valve 10 is illustrated in the state in which the pressure relief valve 10 is removed from the molding process. When the pressure relief valve 10 is formed in the production process, the flaps 40 extend generally outwardly in the same general direction as the lateral walls 20, 22. This molding configuration imbues the flaps 40 and the hinge regions 44a, 44b with an inherent biasing effect in the upward direction and outward direction. Prior to installation, however, of the pressure relief valve 10, into a vehicle body, the flaps 40 are pressed past lips 27, 29, and 30 and into the voids 25a, 25b. Thereafter, by virtue of the inherent biasing effect of the hinge regions 44a and 44b, the flaps 40 attempt to return to their generally outward positions and are stopped by the seating areas 27a, 29a, and 30a. In addition, the inherent biasing effect of the hinge regions 44a and 44b may be increased or decreased depending upon the thickness of the hinge regions 44a and 44b. In a preferred embodiment of the present invention, the flaps 40 of the pressure relief valve 10 will be of a thickness between 0.20 mm and 2.0 mm. In a more preferred embodiment, the thickness of the flaps 40 will be between 0.30 mm and 1.0 mm. The hinge regions 44a and 44b will have a preferred thickness of between 0.10 mm and 0.90 mm and a more preferred thickness of between 0.20 mm and 0.75 mm. Therefore, the desired biasing force of the hinge regions 44a and 44b may be customized for the particular use to which the pressure relief valve will be placed.

Figure 4:
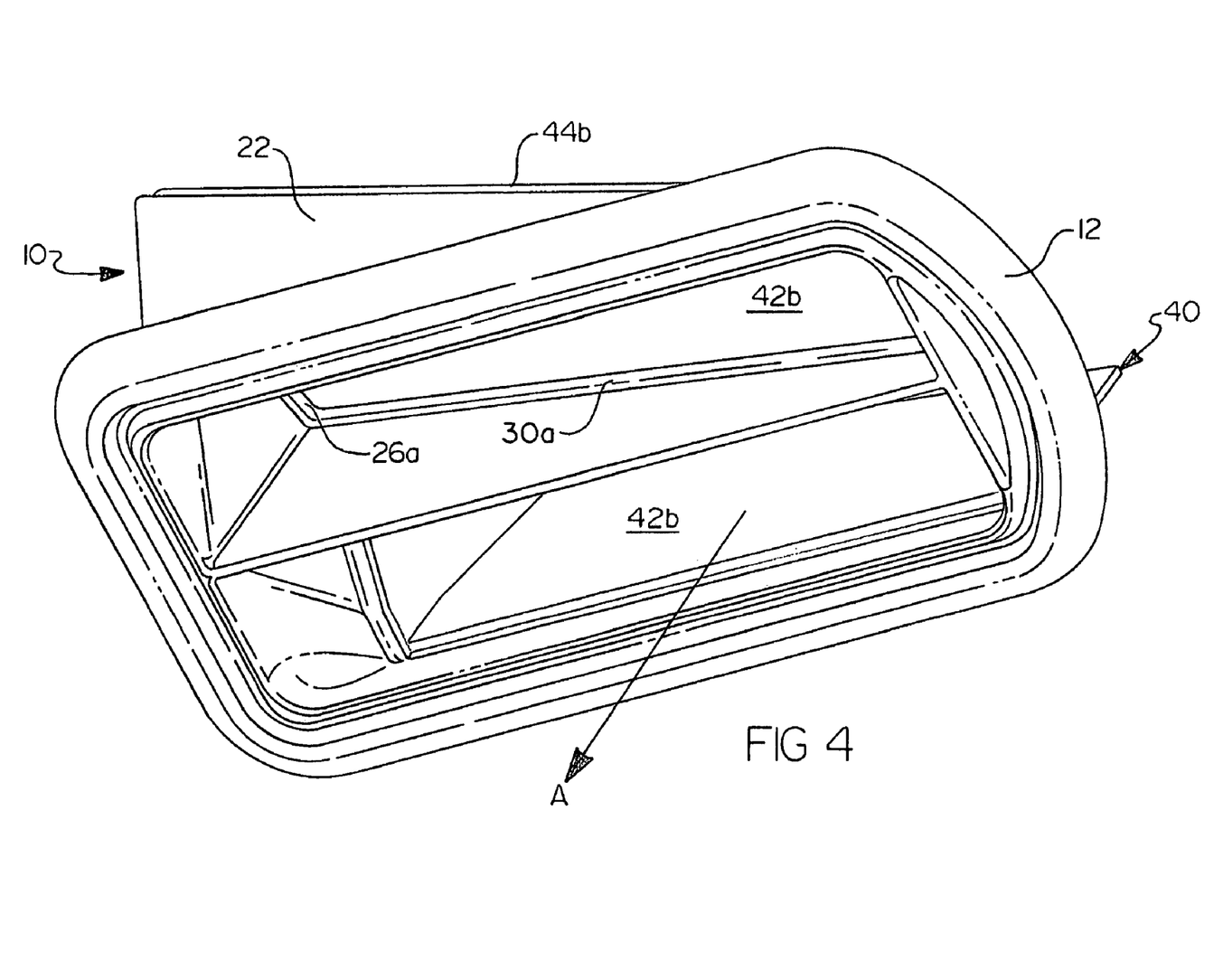
FIG. 4 is a perspective view of the pressure relief valve, like that shown in FIG. 1 except that the flaps of the exhauster are in the operative position.

With reference to FIG. 4, a pressure relief valve 10 is shown with one of the flaps 40 in the seated or closed position. The bottom of the flap 42b may be seen through the bottom of the pressure relief valve 10. The edges of the flap 40 engage the under lip areas 27a, 29a, 30a and seal the flap 40 closing the pressure relief valve 10. When installed in a motor vehicle (see generally FIG. 5), air will flow from within the cabin toward the pressure relief valve 10 engaging the tops 42a of the flaps 40. When the air pressure within the cabin reaches a pressure greater than the inherent biasing force of the hinge regions 44a and 44b, the flaps 40 move into the voids 25a, 25b. When the flaps 40 have been moved into the voids 25a and 25b, air may then flow from the cabin through the pressure relief valve 10 in the direction of Arrow A (see FIG. 1). In this way, the pressure within the cabin may be equalized with the outside and air may flow easily through the cabin. It is to be understood that the inherent biasing of the hinge regions 44a, 44b keep the flaps 40 seated against the seating areas 27a, 29a and 30a when the air pressure is equivalent on both sides of the valve.

When closed, moisture, debris or air may not move back through the pressure relief valve 10 into the vehicle cabin. Due to the seating arrangement of the flaps 40, when air attempts to flow from outside the vehicle body into the cabin, the seated flaps 40 do not allow air to flow in that direction. Therefore, the pressure relief valve is understood to be a one way valve.

With reference to FIG. 5, an environmental view of an installed pressure relief valve 10, according to the present invention, is illustrated. An automobile 50 generally includes a front portion 52 and a rear portion 54. In particular, the rear portion 54 includes the pressure relief valve 10 installed in a lower portion thereof. The pressure relief valve 10 is typically installed in a body panel of the automobile 50 generally covered by a fascia or a bumper 56 portion. A bumper 56a is also installed on the front portion of the vehicle which would generally mirror the rear portion 54 of the vehicle.

It is to be understood that the cabin of the automobile, in particular a sedan or the like, is generally bounded by the top of the car 58, an internal floor pan 60, a forward firewall 62, rear seats and a back wall of the cabin 64, and on the sides by a plurality of doors 66 and windows 68. It is to be further understood that this is exemplary only. In particular, vehicles such as SUV's may not have a cabin bounded by a rear seat. Rather, in large SUV's and station wagons, the back of the passenger cabin may be bounded by a back or hatch door. Such back or hatch door are themselves bounded by vertical pillars which engage the door in the closed position.

The portions of the vehicle bounding the passenger cabin are not impervious to air flow, therefore the pressure relief valve 10 may still act as a valve for the cabin area of the automobile 50 even though it is not physically connected to the vehicle cabin. Therefore, once the pressure relief valve 10 is installed in the vehicle 50, any change in cabin pressure may be relieved by the pressure relief valve 10 even though the pressure relief valve 10 is not in direct contact with the passenger cabin due to the fact that it is in fluid contact with the passenger cabin. It is to be further understood that the presently disclosed pressure relief valve 10 may be installed in other areas of the automobile so that it has contact with the outside and the passenger cabin, such as in the wheel wells. As a further example, a pressure relief valve 10 may be placed beneath the front bumper 56a in the same way as it is placed under the rear body of bumper 56. Furthermore, the pressure relief valve 10 may be installed in the pillars of an SUV (see discussion above). In addition, the biasing hinges 44a and 44b hold the flaps 40 in the seated position even when the pressure relief valve 10 is mounted horizontally. Therefore, the pressure relief valve 10 may also be mounted in the roof 58 of a vehicle 50 or the top of a wheel well.

With general reference to all the Figures and particular reference to FIG. 1, further details of the pressure relief valve 10 are disclosed. The preferred material of the pressure relief valve 10 is a flexible polymer, a thermoplastic elastomer, or preferably a thermoplastic vulcanite (TPV). One particular TPV is SX70 manufactured by Solvay Engineered Polymers. Such materials or similar materials have a general flexibility feature allowing the finished product to be fully flexible. Furthermore, it is preferred that the entire pressure relief valve 10 be unitarily formed of a singular material temporarily deformed. The entire pressure relief valve 10 may be folded or otherwise deformed into a smaller dimension before insertion into a motor vehicle 50 body. In particular, the end walls 18 and 24 will include structures to assist the deforming of the pressure relief valve 10. In particular, valley 70 will facilitate the collapse of the side walls 20 and 22 towards the third lip 30. Additionally, reinforcement sections 72 will transfer forces applied to the side walls 20 and 22 towards the valley 70 and further assist the directed deformability of the pressure relief valve 10. In this way, the pressure relief valve 10 may be quickly and easily installed into an aperture in a vehicle 50. Therefore, the vehicle body aperture, into which the pressure relief valve 10 is installed, may be of a dimension much smaller than the actual size ingress side of the pressure relief valve 10. However, the dimensions of the aperture in the vehicle body will be of the same general dimensions as the body flange 14.

The preferred embodiment of the valve 10 is configured such that the walls 18, 20, 22, and 24 extend in a non-perpendicular manner. More particularly, each of the walls 18, 20, 22 and 24 extend obliquely and will form an acute angle with the body flange 14. In this way, vehicle cabin side of the voids 25a, 25b will have an overall dimension greater than or equal to the aperture in the motor vehicle 50, wherein such aperture is defined to be no greater than the inner dimensions of the flange 12. In this way, due to the venturii effect of the sloped walls of the pressure relief valve 10, the air flow through the valve 10 will be equal or nearly equal to that of an open aperture in the motor vehicle 50.

Figure 6:
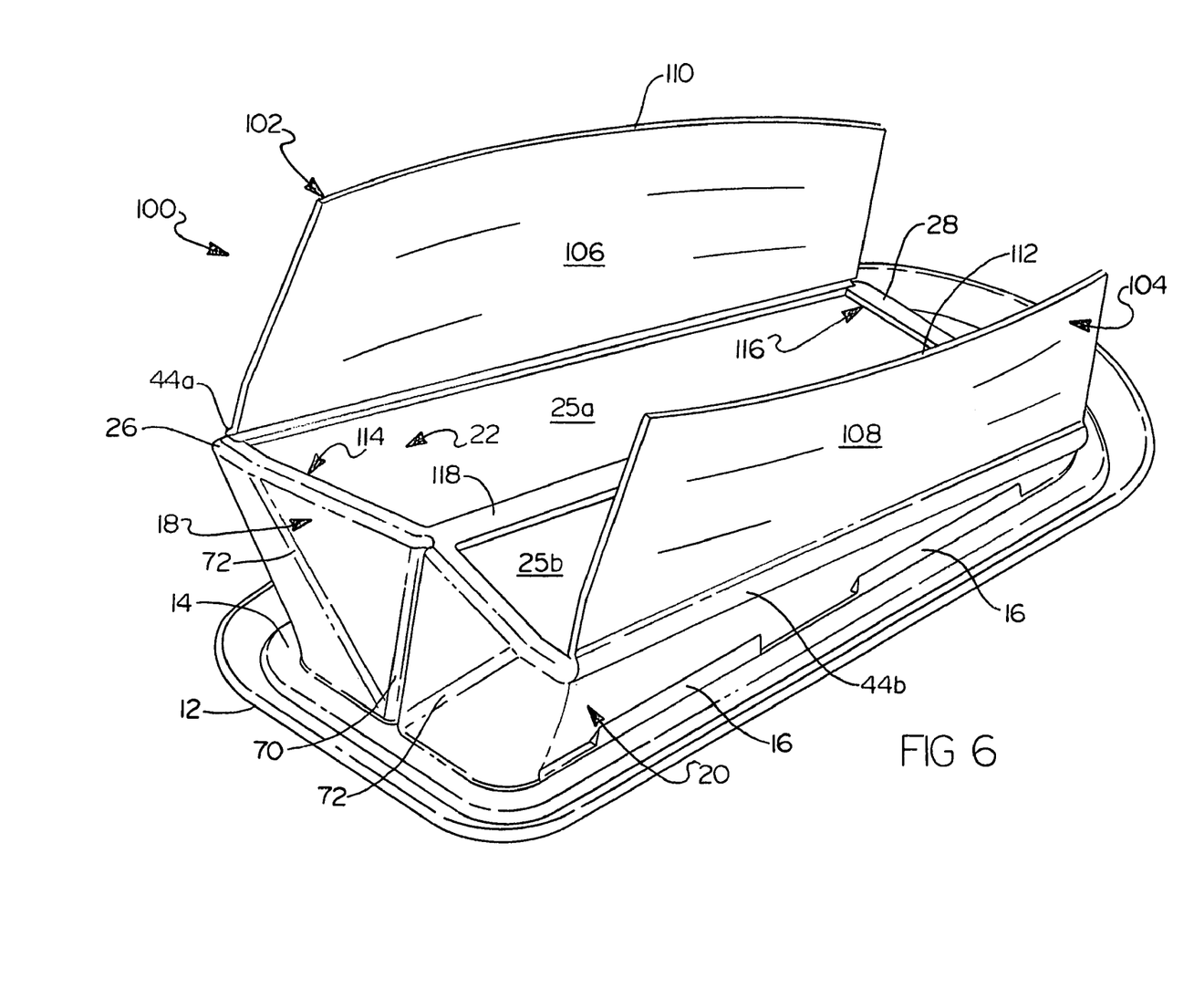
FIG. 6 is a perspective view of the pressure relief valve according to a second embodiment of the present invention.

With reference to FIG. 6 a pressure relief valve 100, according to a second embodiment of the present invention, is illustrated, wherein like reference numerals reference like portions as described above in reference to the first embodiment. The pressure relief valve 100 includes a first valve flap 102 and a second valve flap 104. The first valve flap 102 includes a bottom side 106 and a topside (not illustrated). The second flap 104 includes a top side 108 and a bottom side (not illustrated). A distal edge 110 of the first flap 102 extends the length of the first flap 102. A distal edge 112 of the second flap 104 also extends the length of the second flap 104. According to the second embodiment, the leading edges 110 and 112 have a profile other than a line or planar profile. For example, the leading edge 110 may include a radius of curvature of any appropriate degree. The leading edge 112 of the second flap 104 may also include a radius of curvature of a substantially corresponding degree. This radius of curvature, relative to the flaps 102 and 104, may either be concave or convex. It is also understood that the flap portions 102 and 104 will have the substantially same radius of curvature along the entire width of the flaps 102 and 104. Thus, the entire flap may have a radius of curvature.

When the flaps 102 and 104 have a particular radius of curvature the first lip 114, second lip 116 and third lip 118 all have dimensions which substantially match the shape of the flaps 102 and 104. In particular, this means that the third lip 118 will have a radius of curvature substantially similar to the radius of curvature of the flaps 102 and 104. In this way, when the flaps 102 and 104 are seated on the third lip 118 the flaps form a substantial seal and close the pressure relief valve 100.

The radius of curvature, or any other appropriate shape, of the flaps 102 and 104 is used to selectively determine the amount of pressure required to move the flaps 102 and 104 from the seated or closed position, that is when the flaps engage the lips 114 through 118, to the open position. For example, one particular radius of curvature may require approximately one pound per square foot of pressure to move the flaps 102 and 104 to an open position. A different radius of curvature, however, may require at least three pounds of pressure per square foot to move the flaps 102 and 104 to the open position. It will be understood, however, that any particular pressure may be tuned by altering the shapes of the flaps 102 and 104. Therefore, the pressure relief valve 100 may be tuned or customized by varying the shapes or profiles of the flaps 102 and 104 to specifically account the amount of pressure required to move the flaps 102 and 104 from the closed or seated position to the open position to allow air to flow through the pressure relief valve 100.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. A pressure relief valve for installation in an aperture of a body panel of a motor vehicle, wherein the pressure relief valve comprises:
    a rim portion substantially defining an air-flow aperture having a perimeter at least as great as a perimeter of the aperture defined by the body panel;
    a plurality of walls in the general form of a funnel having a smaller portion nearer the rim portion and extending from the rim portion generally towards an origin of an air-flow, thereby defining a void; and
    at least one flap hingedly affixed to a distal end of one of the plurality of walls, wherein the flap is displaceable between a closed position and an open position.

2. The pressure relief valve of claim 1, wherein said flap is displaceable between said closed position and said open position depending upon a force being applied to said flap.

3. The pressure relief valve of claim 1, wherein said flap selectively includes a convex or concave shape, wherein the amount of said concavity or said convexity varies the amount of said force required to displace said flap to said open position.

4. The pressure relief valve of claim 1, wherein the pressure relief valve is formed of a resiliently deformable material having a low modulus of elasticity such that the pressure relief valve may be deformed with a force and resiliently reform itself when the force is removed.

5. The pressure relief valve of claim 4, wherein said rim portion, said plurality of walls, and said flap are formed as a unit.

6. The pressure relief valve of claim 1, further comprising:
    a living hinge operably interconnecting said flap and at least one of said plurality of walls, wherein said living hinge biases said flap in said closed position.

7. The pressure relief valve of claim 1, wherein when the flap is in the second open position a flow rate of air permitted to pass through the pressure relief valve is substantially equivalent to a flow rate of air that is permitted to pass through the aperture if no pressure relief valve was installed therein.

8. The pressure relief valve of claim 1, wherein said rim portion, said plurality of walls, and said flap are all resiliently deformable such that the pressure relief valve may be deformed from a first shape with a force, but resiliently returns to the first shape when the force is removed.

9. A pressure relief valve for installation in an aperture of a body panel of a motor vehicle, wherein the pressure relief valve comprises:
   a member defining an air-flow aperture having a perimeter at least equal to the perimeter of the aperture of the body panel;
   a flange extending from said member to engage said body panel when said member is installed in the aperture of the body panel;
   said member including a plurality of walls generally forming a funnel having a wider portion near a source of an air-flow;
   at least one flap extending from a distal end of one of said plurality of walls, said flap being movable between a closed position and an open position; and
   a hinge operably interconnecting said flap and said wall wherein said flap is biased in said closed position by said hinge.

10. The pressure relief valve of claim 9, is formed of a deformable material having a low modulus of elasticity allowing it to be deformed to be installed into the body panel.

11. A pressure relief valve for installation in an aperture of a body panel of a motor vehicle, wherein the pressure relief valve comprises:
   a member defining an air-flow aperture having a perimeter at least equal to the perimeter of the aperture of the body panel;
   a flange extending from said member to engage said body panel when said member is installed in the aperture of the body panel;
   said member including a plurality of walls generally forming a funnel having a small portion nearer said member;
   at least one flap extending from a distal end of one of said plurality of walls, said flap being movable between a closed position and an open position; and
   a hinge operably interconnecting said flap and said wall wherein said flap is biased in said closed position by said hinge;
   wherein at least said member, said flange, and said flap are formed of a deformable material having a low modulus of elasticity allowing it to be deformed to be installed into the body panel;
   wherein said member, said flange, and said flap are formed as a single piece so that the entire structure may be simultaneously deformed to be installed into the body panel.

12. The pressure relief valve of claim 9, wherein said hinge is a living hinge integrally formed between said flap and said wall.

13. The pressure relief valve of claim 9,
   wherein said flap is displaceable from said closed position upon an imposition of a force to said flap;
   wherein said flap selectively includes a profile generally having a convex shape or a concave shape; and
   wherein the degree of said concave shape or said convex shape selectively determines the amount of the force required to move said flap to said open position.

14. The pressure relief valve of claim 9, further comprising:
   a plurality of walls, wherein said plurality of walls generally define a funnel shape such that the flow rate of air through the member is substantially at least equal to the flow rate of air through the aperture if the pressure relief valve was not installed therein.

15. A pressure relief valve for installation in a body panel, defining an aperture, of a motor vehicle, wherein the pressure relief valve comprises:
   a valve body defining an air-flow conduit having a perimeter that is substantially equal to a perimeter of the aperture defined by the body panel;
   a valve flap extending from said valve body and displaceable between an open position and a closed position; and
   a living hinge operably interconnecting said valve body and said valve flap, wherein said hinge biases said valve flap in said closed position;
   wherein said valve body is substantially resiliently deformable such that said valve body is capable to be deformed to be installed into the aperture defined by the body panel and resiliently engage the body panel after installation;
   wherein a selected distal perimeter of said airflow conduit is greater than said perimeter of the aperture defined by the body panel wherein an airflow is from a distal perimeter;
   wherein said valve flap extends from said selected distal perimeter.

16. The pressure relief valve of claim 15, wherein said flap is displaceable from said closed position to said open position upon the imposition of a force on said flap.

17. The pressure relief valve of claim 16, wherein said flap selectively includes a shape, wherein said shape determines the magnitude of force necessary to displace said flap from said closed position to said open position.

18. The pressure relief valve of claim 17, further comprising a valve seat, wherein the shape of the valve seat substantially matches said shape of said flap such that when said flap is in said closed position a substantial seal is formed.

19. The pressure relief valve of claim 15, is formed of a material having a low modulus of elasticity such that the pressure relief valve may be deformed to be installed in the body panel.

20. The pressure relief valve of claim 19, wherein said material comprises a thermoplastic elastomer.

21. The pressure relief valve of claim 15, wherein said valve body, said valve flap and said living hinge are integrally formed so that all are simultaneously deformable.

* * * * *

UNITED STATES PATENT AND TRADEMARK OFFICE
CERTIFICATE OF CORRECTION

PATENT NO. : 6,969,314 B2
DATED : November 29, 2005
INVENTOR(S) : Howard R. Misner It is certified that error appears in the above-identified patent and that said Letters Patent is hereby corrected as shown below:

<u>Title page,</u>
Item [73], Assignee, "Compang" should be -- Company --.

<u>Column 3,</u>
Line 38, after "reference" insert -- to --.

<u>Column 7,</u>
Line 42, "small" should be -- smaller --.

<u>Column 8,</u>
Line 35, "panel wherein" should be -- panel --.

Signed and Sealed this

Twenty-first Day of March, 2006

JON W. DUDAS
*Director of the United States Patent and Trademark Office*